May 27, 1930.  M. OKOCHI ET AL  1,760,518
APPARATUS FOR MEASURING PISTON RING PRESSURE
EXERTING UPON CYLINDER WALLS
Filed June 22, 1927   2 Sheets-Sheet 1

Inventors:
M. Okochi and
K. Ebihara

By Attorneys: Marks & Clerk

Inventors:
M. Okochi and
K. Ebihara

Patented May 27, 1930

1,760,518

UNITED STATES PATENT OFFICE

MASATOSI OKOCHI AND KEIKICHI EBIHARA, OF SHITAYA-KU, TOKYO, JAPAN, ASSIGNORS TO ZAIDAN HOJIN RIKGAKU KENKYUJO, OF TOKYO, JAPAN

APPARATUS FOR MEASURING PISTON-RING PRESSURE EXERTING UPON CYLINDER WALLS

Application filed June 22, 1927. Serial No. 200,698.

The present invention relates to improvements in an apparatus for measuring the pressure exerted by piston rings upon the cylinder walls of an internal combustion engine. This invention has for its object to improve the piezo-electric pressure gauge which is described and illustrated in U. S. Patent 1,698,200. The pressure gauge as described in the above referred patent application has the disadvantage because of the fact that the piezo-electric crystals are clamped by means of bolts and nuts in order to avoid any leakage of the piezo-electric charge due to dust and moisture and the disturbances caused by the electric magnetic induction, it is necessary to enclose the entire apparatus by a suitable container. It has the further disadvantage that it is only applicable for a ring of a predetermined diameter and will not measure the piston ring pressure on rings of different diameters. Between the ring surface and the cylinder wall a plurality of hemp strips are used to eliminate the friction and this, therefore, results in loss of considerable time in making the tests and increases the margin of error.

It is a further object of the invention to construct a measuring device of this character which will permit the testing of piston rings of various diameters with a certain limit in a simple manner and to decrease the margin of error.

Further features and objects of the invention will be more fully understood from the following detailed description and the accompanying drawings in which.

Figure 1:
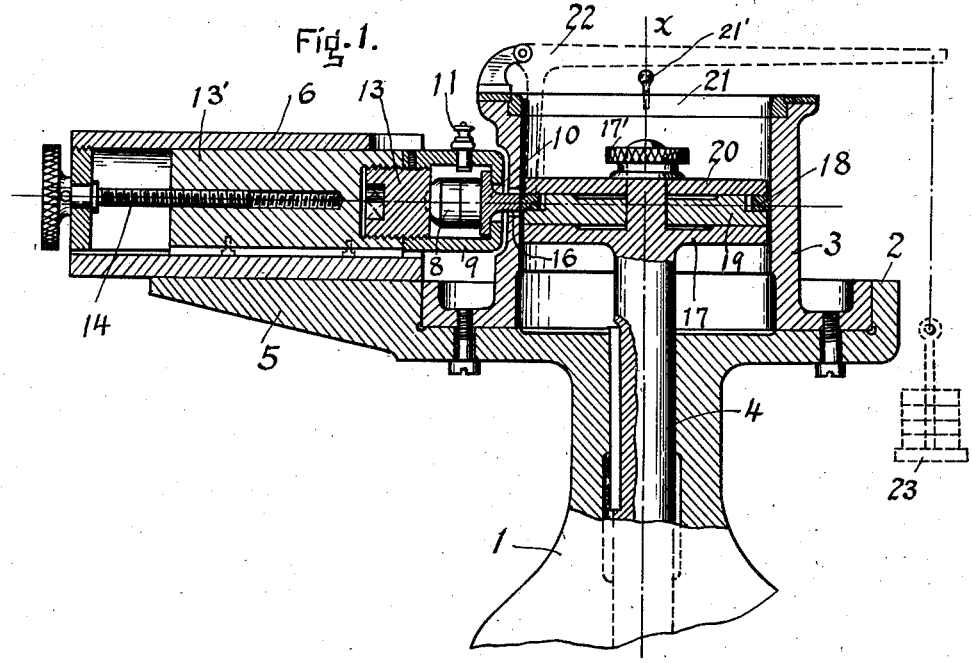
Fig. 1 is a sectional elevation of the device.
Figure 2:
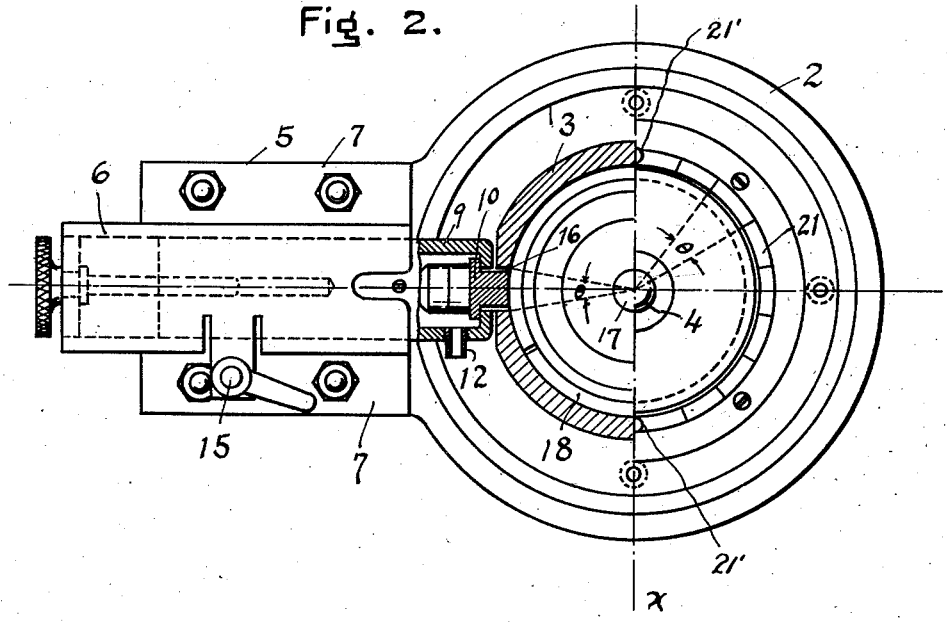
Fig. 2 is a plan view thereof partly in section.

The frame which is suitably secured to a suitable foundation is provided with a shallow cylindrical cup 2 at the top thereof. The cylinder 3 which is adapted to receive the piston ring to be tested is provided with a flange at its lower part corresponding to the cylindrical cup 2, it being necessary that the axis of the frame 1 and that of the cylinder 3 be in perfect alinement. The guide 4 of piston 17 maintains the piston parallel to the axis $x$—$x'$ of the frame 1. The arm 5 of the frame 1 serves as a foundation for the piezo-electric pressure gage so that the upper surface thereof is at right angles to the axis $x$—$x'$. A guide cylinder 6 moves or displaces the pressure gauge in radial and right angle direction to the axis $x$—$x'$ and is fixed to the arm 5 by clamping the flanges 7 to the arm by means of a bolt or the like. A plurality of quartz plates 8 are enclosed in a vessel 9 which is made of ferro-magnetic material as nickel or iron. A member 10 which is made of the same material as the cylinder 3 forms at its inner surface an arc, the radius of which is equal to that of the largest piston ring and the pressure of the piston ring is transmitted directly thereto without any other resisting element. A terminal 11 is adapted to be connected to a conductor of an electro-meter which measures the piezo-electric charge produced in the quartz plates. The pipe 12 communicates with a convenient air drier and maintains the chamber of the vessel 9 in a dry condition. Inside of the cylinder 6 there is provided a plunger 13' the inner end of which is connected to the pressure gauge through a member 13 which forms an abutment for the quartz plates. By radially moving the plunger 13' by means of an adjusting screw 14 the position of the pressure gauge is easily varied within a certain limit and the pressure gauge can be set in any position by clamping it to the cylinder 6 by means of the clamping lever 15. The inner wall of the cylinder 3 should be finished by a grinder or the like so that the inner diameter thereof is the same as that of a cylinder of an engine or of a compressor in which the ring is adapted to be used. The cylinder is provided with a rectangular aperture 16. The dimensions of this aperture are such that its height is somewhat larger than that of the ring and its length subtends an angle of 10 to 20° at the center of the cylinder. The piston ring 18 to be tested is arranged between two disks 19 and 20. A closed ring 21 is loosely arranged in an annular recess at the top of the cylinder 3 in such a manner that it may be freely rotated on pivots 21'. The periphery of the closed ring 21 is graduated to an angle $\theta$ as illustrated in Fig. 2 and its inner wall is in perfect alinement with the inner wall of the cylinder 3. The piston ring to be tested is shifted from the position shown to the closed ring 21 and is rotated together therewith through an angle $\theta$. The calibration of the pressure gauge is obtained by means of the lever 22 by applying a weight 23 to the end of its arm and applying a known pressure to the member 10 as shown in dotted lines in Fig. 1.

Figure 3:
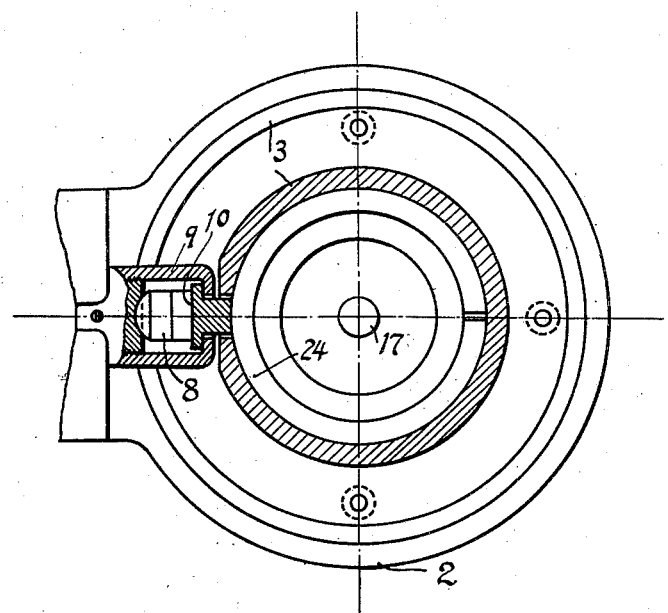
Fig. 3 is a partial plan view partly in section illustrating how a predetermined position of the pressure gauge is accurately adjusted; and, Fig. 4 is a sectional plan view of a modification of the pressure gauge.
Figure 4:
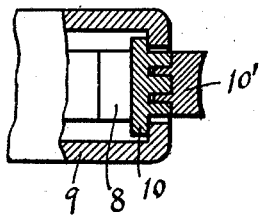

Fig. 3 illustrates how the inner end of the pressure gauge is exactly brought into contact with the cylinder 3 of a member 13 which forms an abutment, the inner end forming a part of an arc the radius of which is the same as that of the largest ring to be tested. A standard ring 24 which exerts uniform pressure upon the inner wall of the cylinder 3 may be manufactured by a process such as described in the specification of U. S. Patent No. 1,666,343, is inserted in the cylinder 3 and the pressure gauge slowly pushed inward by means of the screw 14. When the inner end of the pressure gauge touches the outer surface of the standard ring 24, an aperture is produced between the contacting surfaces which is indicated by the piezo-electric charge. Therefore when a small charge is first observed the inner end of the pressure gauge coincides with the inner wall of the cylinder 3. If the diameter of the standard ring is smaller than that of the arc of the inner end of the pressure gauge, only the central portion of the arc will touch the outer surface of the standard ring. However, if desired an additional member 10', the inner end of which has an arc of the same diameter as that of the standard ring may be detachably connected as shown in Fig. 4 and a number of such pieces may be utilized for corresponding various standard rings.

The operation of testing the rings by the tester is as follows: First, a cylinder 3 corresponding to a ring to be tested is arranged on the frame 1 and after adjusting the position of the pressure gauge by inserting a standard ring of the same diameter, such as described in the preceding paragraph, the pressure gauge is fixed to the cylinder 6 by means of a clamping lever 15, the standard ring 24 is then taken out of the cylinder 3 and replaced by the ring to be tested. After this ring is moved up and down a few times at the upper solid part of the cylinder wall, it is brought to the position of the pressure gauge, all these operations being carried out by moving the piston 17 by means of its thumb nut 17'. As the pressure gauge is connected to a highly sensitive electrometer, the indicating needle of the meter is deflected by piezo-electric charge produced by pressure of the piston ring upon the piece 10. More precisely, the magnitude of this deflection of the needle is proportional to the pressure of a segment of the piston ring for an angle $\theta$ upon the pressure gauge, that is, the pressure of said segment upon the cylinder wall. Next, the piston ring is displaced upward and pushed into the closed ring 21 and rotated through an angle $\theta$. The piston ring is then again brought down to the position of the pressure gauge and the measuring operation is thus repeated for every successive segment for an angle $\theta$ by and by so that the distribution of the pressure upon the whole circumference of the piston ring can be observed.

What we claim is:

1. A machine for testing piston ring pressure upon cylinder wall, comprising a frame provided with a shallow cylindrical cup at the top, a cylinder having a flange adapted to be detachably clamped to the top of said frame, a piston having a guide arranged reciprocately in said cylinder and supporting a piston ring to be tested, the axis of said frame, cylinder and piston and its guide being arranged in alinement with each other, piezo-electric crystals arranged outside the cylindrical cup, means for transmitting the piston ring pressure to the piezo-electric crystals projecting through the cylindrical cup and a means for radially adjusting the position of a piezo-electric pressure gauge which is supported by an arm of said frame.

2. A machine for testing piston ring pressure upon cylinder wall, comprising a frame provided with a shallow cylindrical cup at the top, a cylinder having a flange adapted to be detachably clamped to the top of said frame, a piston having a guide arranged reciprocately in said cylinder and supporting a piston ring to be tested, the axis of said frame, cylinder and piston and its guide being arranged in alinement with each other, piezo-electric crystals arranged outside the cylindrical cup, means for transmitting the piston ring pressure to the piezo-electric crystals projecting through the cylindrical cup and a means for radially adjusting the position of a piezo-electric pressure gauge which is supported by an arm of said frame, the piezo-electric pressure gauge being enclosed by a vessel made of ferro-magnetic material.

3. A machine for testing piston ring pressure upon cylinder wall, comprising a frame provided with a shallow cylindrical cup at the top, a cylinder having a flange adapted to be detachably clamped to the top of said frame, a piston having a guide arranged reciprocately in said cylinder and supporting a piston ring to be tested, the axis of said frame, cylinder and piston and its guide being arranged in alinement with each other, piezo-electric crystals arranged outside the cylindrical cup, means for transmitting the piston ring therethrough to the piezo-electric crystals projecting through the cylindrical cup, and means for radially adjusting the position of a piezo-electric pressure gauge which is supported by an arm of said frame, a closed ring loosely supported by the cylinder at the top thereof, the inner wall of the closed ring forming a part of the cylinder.

4. A machine for testing piston ring pressure upon cylinder wall, comprising a frame provided with a shallow cylindrical cup at the top, a cylinder having a flange adapted to be detachably clamped to the top of said frame, a piston having a guide arranged reciprocately in said cylinder and supporting a piston ring to be tested, the axis of said frame, cylinder and piston and its guide being arranged in alinement with each other, piezo-electric crystals arranged outside the cylindrical cup, means for transmitting the piston ring therethrough to the piezo-electric crystals projecting through the cylindrical cup, a two-armed lever and weight device adapted to have a weight applied to one of its arms, the other arm exerting a certain known pressure upon the pressure gauge for calibration thereof, and a means for radially adjusting the position of a piezo-electric pressure gauge which is supported by an arm of said frame.

In testimony whereof we affix our signatures.

MASATOSI OKOCHI.
KEIKICHI EBIHARA.